United States Patent [19]
Hall

[11] Patent Number: 5,909,679
[45] Date of Patent: Jun. 1, 1999

[54] KNOWLEDGE-BASED MODERATOR FOR ELECTRONIC MAIL HELP LISTS

[75] Inventor: Robert J. Hall, Berkeley Heights, N.J.

[73] Assignee: AT&T Corp, Middletown, N.J.

[21] Appl. No.: 08/745,202

[22] Filed: Nov. 8, 1996

[51] Int. Cl.[6] .................................................. G06F 17/00
[52] U.S. Cl. .............................................. 707/4; 707/104
[58] Field of Search .................................. 395/12, 54, 63, 395/23, 77, 75, 11; 707/4, 104; 371/15.1; 206/52

[56] References Cited

U.S. PATENT DOCUMENTS

| | | | |
|---|---|---|---|
| 4,884,218 | 11/1989 | Agnew et al. | 395/54 |
| 4,930,071 | 5/1990 | Tou et al. | 707/4 |
| 5,239,617 | 8/1993 | Gardner et al. | 395/12 |
| 5,282,265 | 1/1994 | Rohra Suda et al. | 395/12 |
| 5,307,446 | 4/1994 | Araki et al. | 395/77 |
| 5,386,498 | 1/1995 | Kakefuda | 395/75 |
| 5,487,132 | 1/1996 | Cheng | 395/63 |
| 5,715,371 | 2/1998 | Ahamed et al. | 395/11 |

FOREIGN PATENT DOCUMENTS

| | | | |
|---|---|---|---|
| WO 96/23266 | 8/1996 | WIPO | G06F 17/30 |

OTHER PUBLICATIONS

S. D. Whitehead, "Auto–FAQ: an experiment in cyberspace leveraging," *Computer Networks and ISDN Systems*, vol. 28, No. 1, Dec. 1995, pp. 137–146.

K. Hammond, R. Burke, C. Martin and S. Lytinen, "FAQ Finder: A Case–Based Approach to Knowledge Navigation," *Proceedings of the 11th Conference on Artificial Intelligence for Applications*, Los Angeles, CA, Feb. 20–23, 1995, pp. 80–86.

S. Dumais; Finding what you want: new tools and tricks; *IEEE Software*, 12(5), 79ff. Sep. 1995.

W.P. Jones; On the applied use of human memory models: the memory extender personal filing system; *Intl. J. Man–Machine Studies 25*, 191–228, 1986.

A. Luotonen. H. Frystyk, & T. Berners–Lee; "W3C Httpd"; World–Wide Web Consortium; http://www.w3.org/hypertext/WWW/Daemon/Overview.html; 1995.

J.C. Mallery; A common lisp hypermedia server: In *Proc. First Intl. Conf. on the World–wide Web*; Geneva: CERN; 1994. See also http://wilson.ai.mit.edu/cl–http/cl–http.html.

J. Myers & M. Rose; "Post Office Protocol—Version 3"; Network Working Group Request for Comments 1725 (RFC 1725, Nov. 1994); currently available at http://andrew2.andrew.cmu.edu/rfc/rfc1725.

(List continued on next page.)

*Primary Examiner*—Wayne Amsbury
*Assistant Examiner*—Thuy Pardo

[57] ABSTRACT

A method of updating a knowledge base containing information about a subject matter, the knowledge base being used to automatically respond to messages containing questions or comments relating to the subject matter, the method includes the steps of logging the message in a log if the knowledge base does not address the message; providing the logged message to a subject matter expert; and permitting the subject matter expert, but not other users of the knowledge base, to update the knowledge base in response to the logged message. The method further includes the steps of sending the logged message to one or more persons on a list of people with knowledge about the subject matter; receiving a message from at least one of the persons and logging the received message in association with the logged message; and the step of providing the logged message further provides the received message to the subject matter expert. The method of the present invention represents and uses stored knowledge to formulate a query for each entry and associate the query with a piece of the stored knowledge so that the piece of stored knowledge is retrieved when a message satisfies the query.

23 Claims, 5 Drawing Sheets

OTHER PUBLICATIONS

B.J. Rhodes & T. Starner; Remembrance agent: a continuously running automated information retrieval system; in *Proc. AAAI Spring Symposium on Acquisition, Learning, & Demonstration: Automating Tasks for Users*, AAAI Press Technical Report SS–96–02, 122–125; Menlo Park, CA: AAAI Press; 1996.

G. Salton, ed.; *The SMART Retrieval System: Experiments in Automatic Document Processing*; Engelwood Cliffs, NJ: Prentice–Hall; 1971.

J. Weizenbaum: ELIZA–A computer program for the study of natural language communication between man and machine; *Communications of the ACM*, 9, 36–45; 1966.

S.D. White head; Auto–FAQ: an experiment in cyberspace leveraging; in *Proceedings of the Second World Wide Web Conference 1994: Mosaic and the Web,* vol. 1, 25–38; 1994. See also http://ww.ncsa.uiuc.edu/SDG/IT94/Proceedings/gents/whitehead.html.

FIG. 2 info-infomod Query Form
Type your email address here: [_____] — 250
Subject: [_____] — 260
Type your message below:

[                                              ] — 210

Action (select one):
220 — ☐ KB Query Only
230 — ☐ Email to list
240 — [Submit]

KNOWLEDGE-BASED MODERATOR FOR ELECTRONIC MAIL HELP LISTS

TECHINICAL FIELD

The present invention relates to the field of informational electronic mail or Internet accessed help lists and newsgroups and, more particularly, to a method of establishing and querying a help list via threads and teasers as will be further described herein.

BACKGROUND OF THE INVENTION

Users of a product or service need timely answers to their questions about how to acquire, install or use the product or service. Of course, in the prior art, there exists magazines and advertisements for describing new products and services and, once purchased, user manuals to help new purchasers use them. Now, it is prevalent to also provide telecommunications or mail support services. Typically, the provider of the product or service pays a subject matter expert ("SME") to staff a "help-desk". The SME's are available in person, by phone, postal mail, electronic mail ("E-mail") or via the Internet. The Internet is a well-known network of interconnected computers and networks which facilitates the exchange of information, data, and files between the computers and networks.

Another approach that is becoming common is for a provider of a product or service to maintain an informational E-mail list to which users may subscribe. The list is read by the SME's and is also accessible for reading by all the users on the list. Any list member can send questions and answers to the list. Answers to questions can be fielded not just by SME's but by users as well.

A feature of the help list is that the service or product provider can devote less effort, for example, in the form of staff time to answering questions than conventional telecommunications help lines. It has been discovered that human nature seems to lead list members to naturally enjoy, or at least not to mind, helping their peers with questions they themselves know how to answer. Moreover, users tend to be available at all hours whereas paid staff SME's tend to follow the 9-to-5 business day. Thus, responses can often be much more rapid than would be possible if only staff members responded to questions. Furthermore, by reading queries and responses of other users, a particular user can potentially learn more quickly than by stumbling over all problems himself. Examples of such help lists include info-mcl@digitool.com for Macintosh Common Lisp users and java-interest@java.sun.com for Java programming language and environment users.

The usefulness and fan of these lists, however, are significantly reduced by the frequent repetition of essentially similar questions. This problem is primarily caused by new users continually joining the list and running into the same problems encountered earlier by others. In addition to such frequently asked questions, questions easily answered by reading the user manual or using coaches or help features for the product or service can be annoying as well.

Another problem arises due to turnover, both in the user population and the provider's staff SME's. When the provider hires new support personnel to replace departing staff, those departing may take with them much practical knowledge of how the product or service works. The new staff will be less effective than the old at answering questions. Also, as experienced users leave the list, their experience is missed as well.

Yet another annoyance in such lists comes from misdirected administrative messages that are sent to list members (such as requests for subscription). While a few such messages are not bothersome, as they multiply, they endanger the existence of the list. Users troubled by such messages will leave the list and thus the list will be less effective.

To avoid loss of effectiveness of such help lists, it would be desirable to build a knowledge database of queries and responses and provide an automatic moderator to formulate responses to queries from, for example, new users. In this manner, old list members would not have to answer repetitive questions and would be encouraged to stay subscribed to the help list.

An early system for providing automated question answering was Eliza, described in *Communications of the ACM*, 9, 1966, at pages 36–45 by J. Weizenbaum, in his article "ELIZA—A Computer Program for the Study of Natural Language Communication Between Man and Machine." It is believed that Weizenbaum and others pioneered a shallow natural language understanding based on pattern matching against a user's input and then generating responses based on pattern-action rules. It successfully fooled some people into thinking a human was answering their questions.

One solution to the problems of help lists found on the Internet is Auto-FAQ, described by S.D. Whitehead in: "Auto-FAQ: An Experiment in Cyberspace Leveraging" which appeared in *Proceedings of the Second World Wide Web Conference* 1994: *Mosaic and the Web,* vol. 1, at pages 25–38. Auto-FAQ is accessed via a web interface, that is, a user accesses a web site and enters a question into a web form. The web, or world wide web, is a well-known globally connected distributed information presentation application on the Internet. The question is compared against a knowledge base of question/answer pairs via a shallow natural language understanding. If no relevant answer is found, then a "gap" is posted to a publicly available gap-list which anyone can read. Anyone who thinks they know the answer can reply by submitting a question/answer pair for addition to the knowledge base.

Potential problems with Auto-FAQ include that the person answering may not know the true answer to a question. There is no SME maintainer to filter the knowledge base entries for bad entries. Auto-FAQ provides a partial solution in that users are able to rate the question/answer pairs as to their effectiveness. A numerical rating, however, of "not useful", for example, is ambiguous—is the answer wrong or did the answer simply not respond to the user's particular questions? There also appears to be no way to prevent receiving several conflicting answers from many different users.

Another problem with Auto-FAQ may be a lack of control in relevance matching and the timeliness of responses. Entries are made in the form of raw text entries having a context field, a question, and an answer. It is the context field which defines a collection of key words for retrieving question/answer pairs. Once the context field is satisfied, the question is scored for relevance, for example, by a vector space matching procedure. Since context keywords must all be matched to a given query, separate entries must be created to cover synonymous context keywords such as "http server" and "web server". Also, the relevance matching is not directly controllable by the creator of the entry, making it difficult to optimize precision and recall during matching. In addition, the posting of answers to gaps is not noticed to users. So users must frequently poll the gap list to determine if the answer to their question is posted.

Others have taken the field of natural language communication with machines a step further in the field of memory extension systems and, more particularly, personal memory prostheses systems. For example, from the B. J. Rhodes et al. article "Remembrance Agent: A Continuously Running Automated Information Retrieval System" which appeared in the 1996 *Proc. AAAI Spring Symposium on Acquisition, Learning & Demonstration: Automating Tasks for Users* of the AAAI Press Technical Report SS-96-02, pages 122–125, it is known that a remembrance agent can automatically assist a system user by providing a continually running automated information retrieval system for monitoring a user's data entry and, thus, thought processes. For example, the system provides a remembrance agent which continuously monitors a window around the user's typing activity. It periodically performs a shallow natural language match of the text in the window against a database of stored personal documents, such as E-mail archives. It then presents at the bottom of the user's screen a ranked list of teasers for the k most relevant entries to the current activity (k is set by the user). The user may then easily retrieve and view an entry's text. The remembrance agent uses vector space relevance matching and does not require human preprocessing of the archive.

This system may be applied to a help list by having the remembrance agent operate in the user's E-mail client, retrieving relevant items from the list's knowledge repository or raw thread log. However, since the system only shows k potentially relevant items, instead of all items judged possibly relevant, the user may miss some relevant items. Altering the remembrance agent to continuously display all relevant items would render it unusable because of the rapidly fluctuating screen area needed. Moreover, by not having it actually filter list traffic, some undesired messages could then get through. In addition, by distributing the knowledge to the E-mail clients, the problem of maintaining and updating all the copies of the knowledge base is introduced (remote retrieval from a centralized repository would likely be too slow for effective remembrance agent use).

Thus, there remains an opportunity in the art to provide further advances in assisting users of help lists to obtain rapid responses to their inquiries while still maintaining the effectiveness of the knowledge based system and not annoying other users.

SUMMARY OF THE INVENTION

In accordance with the principles of the present invention, an automatic moderator for electronic mail help lists is provided which builds and supervises a knowledge base of queries and responses. The automatic moderator is a list agent computer program (hereinafter, simply "list agent") which provides information for a list of people interested in a certain subject matter. Messages and queries are processed by components of the list agent using information maintained in the form of a computer file system. The computer file system maintains a list of interested list members, a log that contains "threads" of messages, as will be further defined herein, and a knowledge base. The thread log is a log of files, each thread comprising a separate file. All messages belonging to a thread are copied to the file for that thread. The knowledge base comprises two parts: items of information about the subject matter and a statistical part that keeps track of the number of times an item of information is queried and how many times it is actually retrieved. Within the knowledge base, each item of information is maintained as a file of four parts: an identifier for the item; a query expression for determining relevance to a message seeking information; a "tease" that summarizes the item, as will be further described herein; and the main data or information of the item or body. The statistical part of the knowledge base may comprise a subdirectory for maintaining files for each item of information including the identifier for the item, the number of matches of the item against the message, and the number of times the main data or body was retrieved.

In use, a user sends a message containing one or more questions or comments to the E-mail list address. The list agent upon receiving the message examines its knowledge base of responses and determines which ones are of potential relevance. While many techniques are available such as vector space techniques, boolean string searching, and keyword based approaches, each of the list agent's knowledge entries contains a query that is applied against the message rather than the other way around using a combination of these techniques. If the list agent finds possible replies, it forms all such replies in the form of a list of identifiers and teasers for the relevant entries, and a copy of the original message with a thread identifier added. When a number of matches are found, the matches are provided in decreasing order of retrieval ratio.

Put another way, the list agent of the present invention represents and uses stored knowledge to formulate a query for each entry and associate the query with a piece of the stored knowledge so that the piece of stored knowledge is retrieved when a message satisfies the query.

Further advantages of the present invention will be described in the detailed description of the knowledge-based moderator that follows.

BRIEF DESCRIPTION OF THE DRAWINGS

In the drawing,

FIG. 2 is a screen display of a web interface for querying an E-mail help list in accordance with the principles of the present invention;

DETAILED DESCRIPTION

Figure 1:
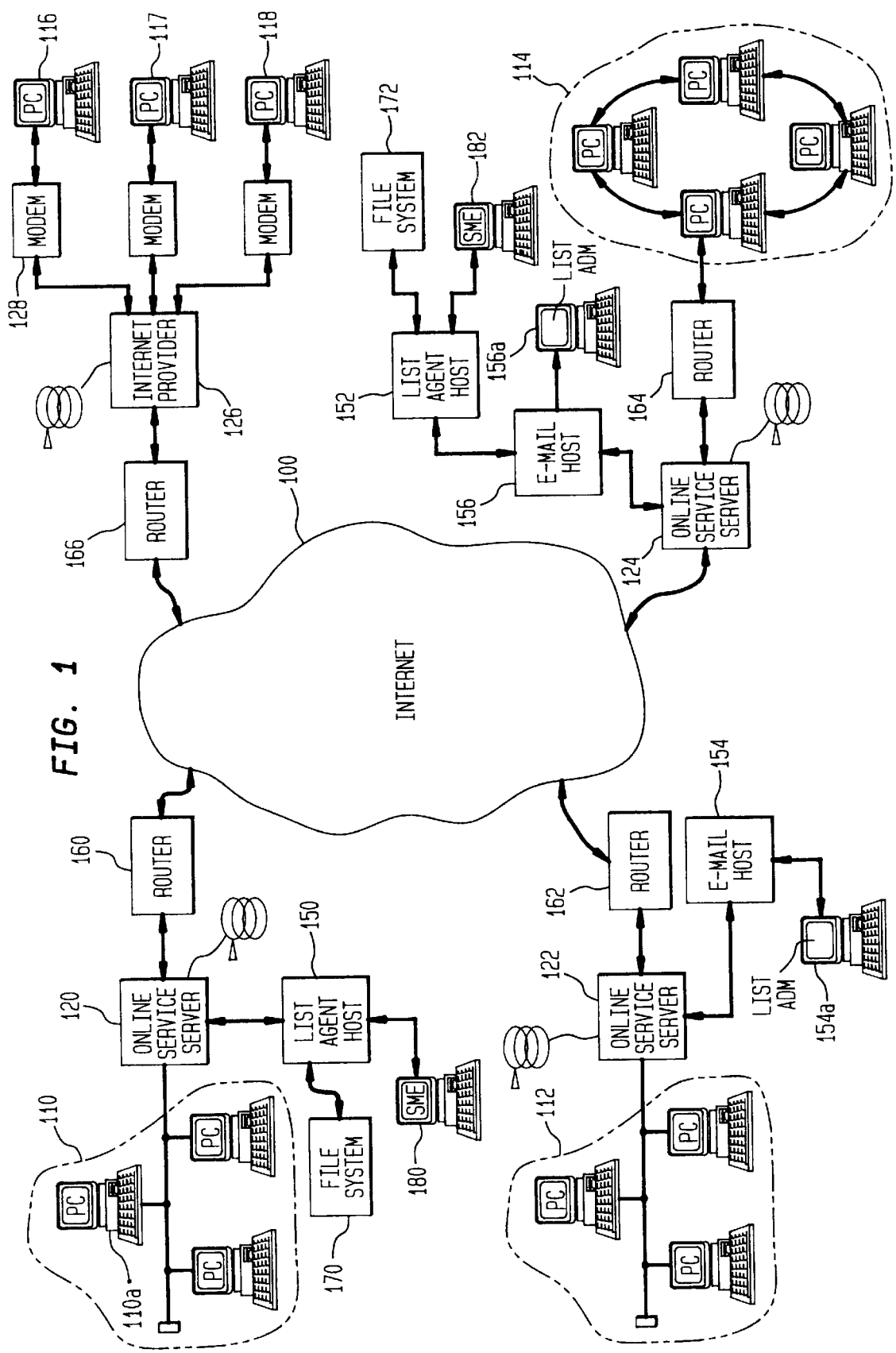
FIG. 1 illustrates a diagram of computers and networks and their connection to the Internet for discussion of the environment in which the present invention operates.

Referring to FIG. 1, there is shown a diagram of computers 116, 117, and 118 and networks 110, 112, and 114 and their connection to Internet 100. The Internet 100 facilitates the exchange of information, data, and files between the computers and networks which are connected to it. Users connected to the Internet have access to the vast amounts of information on these computers and networks. A typical way of gaining access to the Internet is through an online service server. Networks 110, 112, and 114 are connected to Internet 100 via online service servers 120, 122, and 124, respectively. Another way of gaining access to the Internet is through a dial-in Internet provider. Personal computer ("P.C.") 116, for example, is connected to Internet 100 via modem 128 and Internet provider 126.

Routers, which connect computers and networks, are provided to direct traffic in a network and across the Internet. Routers 160, 162, 164, and 166 examine packets of data that travel in a network and across the Internet to determine where the data is headed.

The networks 110, 112, and 114 comprise users who are connected to one another in, for example, a token ring network (network 114) or through an Ethernet network (networks 110 and 112). Each network further comprises a server 120, 122, and 124. A server is a host computer that allows users to communicate with each other on the network or with outside users through the Internet. Users on P.C.'s 116, 117, and 118 may communicate with each other and other users on the Internet 100 by subscribing to host Internet provider 126.

As discussed above, users can currently share ideas by subscribing to a mailing list, for example, an E-mail list. The mailing list allows people to communicate on a regular basis about their shared interests, hobbies, or profession, such as volleyball or American Civil War. To get onto a mailing list, a user sends an addressed E-mail note to a mailing list administrator including the user's E-mail address. For example, a user on P.C. 110a may subscribe to a mailing list on E-mail host 154 or 156 by sending an E-mail to mailing list administrator 154a or 156a. A user may cancel a subscription to the list in the same way as he subscribes to it—by sending an E-mail message to the mailing list administrator. It should be noted that E-mail hosts 154 and 156 may reside anywhere on Internet 100.

Mailing lists can be moderated or unmoderated. A moderated mailing list is screened by a list administrator 154a or 156a. The list administrator decides which messages should be posted and which shouldn't be posted. The messages to be posted are put on an E-mail host 154 or 156. The other messages are discarded. In unmoderated mailing lists, all messages are put directly on the E-mail host 154 or 156. The E-mail hosts 154 or 156 then sends copies of each message to all list subscribers 172a.

Another popular way of sharing ideas on the Internet is to participate in newsgroups. Newsgroups are global bulletin boards and discussion areas where anyone can read and send messages that are posted to the newsgroups. There are thousands of newsgroups that cover just about every topic. Newsgroups are typically found on host computers across the Internet.

As stated above, the current E-mail help lists have many disadvantages such as knowledge inaccuracy, lack of control in relevance matching, and lack of responsiveness. Newsgroups also suffer from these drawbacks.

Accordingly, there remains an opportunity in the art to provide further advances in assisting users of help lists and newsgroups to obtain rapid responses to their inquiries while still maintaining the effectiveness of a knowledge based system. InfoMod, as described herein in accordance with the present invention, provides these advantageous features over the current systems. InfoMod is a knowledge based E-mail list agent computer program or knowledge-based moderator that also provides a world wide web ("web") interface via Hypertext Transfer Protocol ("HTTP") and Hypertext Markup Language ("HTML").

The InfoMod functionality and operation are described below by way of examples. In the following description and examples, it should be noted that different pieces of architecture may reside on distinct networked hosts. Also, while the Internet is used by way of example, the future of telecommunications is unpredictable and the use of InfoMod should not be limited in this regard to a particular network or series of networks. It should also be noted that two or more of the hosts may designate the same machine. For example, a ListMailHost (E-mail host) may reside on online service server 122, a ListAgentHost may reside on online service server 120, a userhost1 may reside on Internet provider 126, and a userhost2 may reside on online service server 124. These hosts, however, may reside on any of these machines (online service server or Internet provider). The following host names are used in the examples:

ListMailHost—host to which mail to the list is addressed (E-mail host);

ListAgentHost—host on which the automated moderator, InfoMod, actually runs;

userhost1, userhost2—hosts from which particular users originate and read mail and where their web browsers run.

As an illustration, the examples here are for a help list devoted to the topic of using InfoMod itsel though this choice of example help topic should not limit the scope of the current disclosure. For example, a user initially sends a message containing one or more questions about InfoMod to the list address as follows:

```
Date: Thu, 14 Mar 96 18:29:43 EST
From: hall@userhost1 (Bob Hall)
To: info-infomod@ListMailHost
Subject: web server conflict
My machine already runs a web server. Can I somehow
make the list moderator compatible, or am I out of luck?
-- Bob
```

A list agent or automated moderator, in accordance with the principles of the present invention, is provided which periodically queries the ListMailHost 154 or 156 for new messages, receives the message, and (in its auto-response phase) examines its knowledge base 500 (see FIG. 5) of responses 510 in determining which of them it judges possibly relevant to the query. The technique by which it judges relevance is discussed below. If it finds any possibly-relevant entries, it replies to the sender (only), with a message containing three essential parts:

The original subject line with a thread identifier added so that future correspondence related to this message can be associated with it. A thread identifier is a number assigned to a message so as to relate the message with future associated correspondence;

A list of identifiers and teasers for the possibly relevant entries. A teaser is a short abstract of the entry, while the identifier is a pathname identifying the entry on the server; and A copy of the original message.

Accordingly, the automated response to the above message is as follows:

```
Date: Thu, 14 Mar 96 18:30:04 EST
From: info-infomod@ListMailHost
To: hall@userhost1 (Bob Hall)
Subject: [info-infomod#17] web server conflict
Here are the knowledge base entries that seem relevant to your message:
-----------------------------------
/kb/httpport
     How do I change which port the HTTP server serves?
-----------------------------------
TO retrieve full text of entry x, send a message with the body line:
     SEND x
-- info-infomod automatic responder
==== original message follows ====
Date: Thu, 14 Mar 96 18:29:43 EST
From: hall@userhost1 (Bob Hall)
To: info-infomod@ListMailHost
Subject: [info-infomod#17] web server conflict
```

-continued

My machine already runs a web server. Can I somehow
make the list moderator compatible, or am I out of luck?
-- Bob The message was assigned to thread identifier #17 (see subject line). This thread identifier is used for relating this message with future associated correspondence. The system only found one possibly relevant knowledge base entry "/kb/httport" and included its teaser "How do I change which port the HTTP server serves?" in accordance with the technique of the present invention. When many possibly-relevant entries are found, they are sorted in decreasing order of retrieval-ratio (the ratio of number of past retrievals to number of past relevance hits). Heuristically, those with a higher ratio may be more likely to be retrieved when found possibly-relevant. The response entries and statistical data relating to their retrieval-ratio are stored in a knowledge base as illustrated in FIG. 5.

Figure 5:
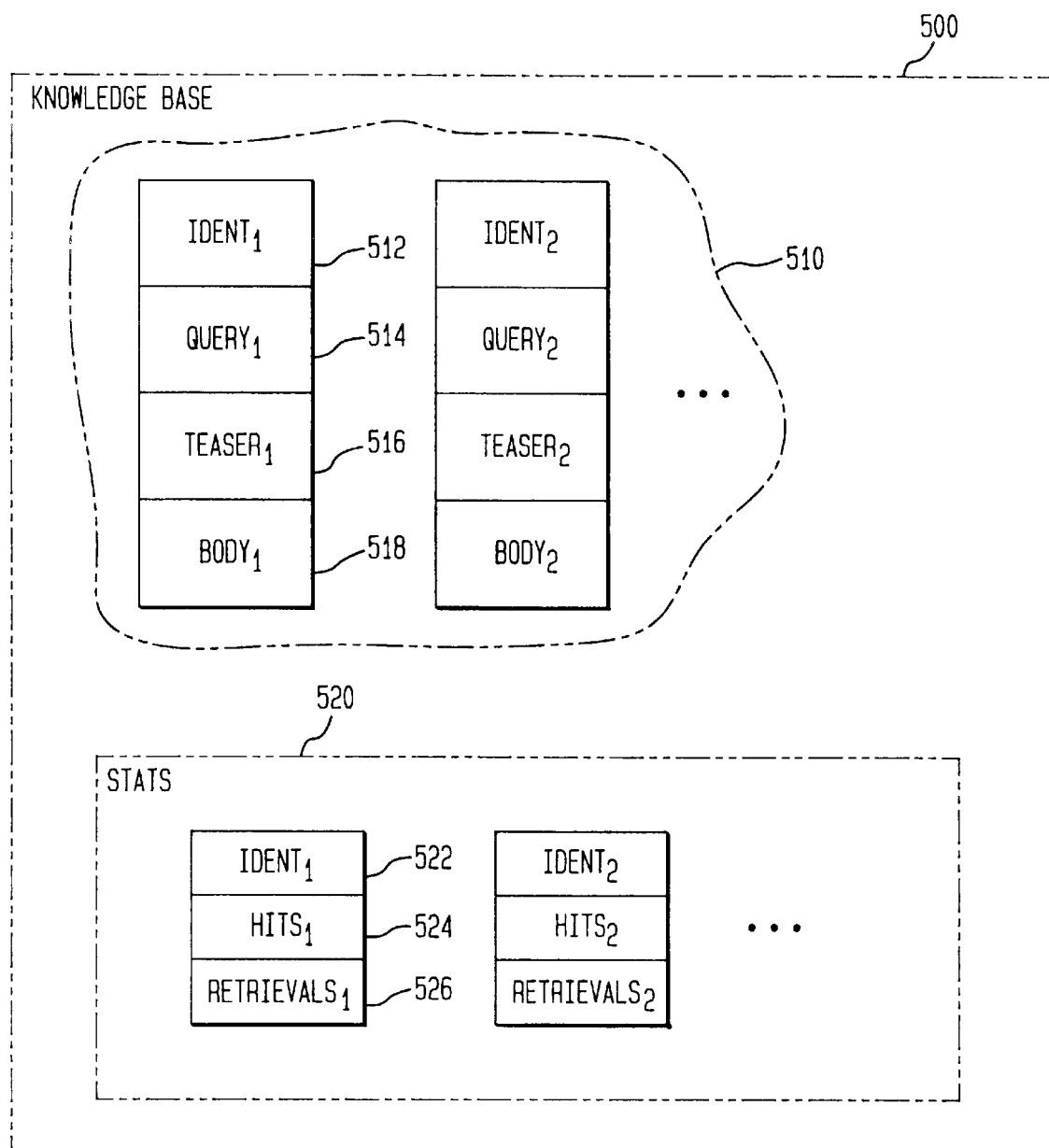
FIG. 5 illustrates a knowledge base which includes response entries and their retrieval data.

Referring to FIG. 5, there is shown a knowledge base 500 which comprises two parts: items of information about the subject matter (entry responses) 510 and a statistical part 520 that keeps track of the number of times an item of information is judged relevant to a query and how many times it is actually retrieved by a user. Within the knowledge base, each item of information (entry response) 510 is maintained as a file of four parts: an identifier for the item 512; a query expression 514 for determining relevance to a message seeking information; a teaser 516 that summarizes the item; and the main data or information of the item or body 518. The statistical part 520 of the knowledge base may comprise a subdirectory for maintaining files for each item of information including the identifier for the item 522, the number of matches of the item to a query 524, and the number of times the main data or body was retrieved 526.

In the above example, the user examines the teaser "How do I change which port the HTTP server serves?" and determines whether to retrieve the relevant knowledge base entry "/kb/httport" from the list agent host 150 or 152. The user can retrieve the full text of any entry by sending another message to the list mail host containing the line "send identifier$_1$ identifier$_2$ . . . ," where each "identifier$_k$" is the identifier of a desired entry, e.g., "/kb/httport". Alternatively, entries can be viewed using a web browser, giving the Uniform Resource Locator ("URL") "http: //ListAgentHost/ identifier$_k$". The response to a "send /kb/httport" in the above example is as follows:

Date: Thu, 14 Mar 96 18:20:25 EST
From: info-infomod@ListMailHost
To: hall@userhost1 (Bob Hall)
Subject: information you requested
Here is the information you requested:
------------------------------------
/kb/httport--
    How do I change which port the HTTP server serves?
    In the configuration file (cf. /doc/config), set the
    LIST-AGENT-HTTP-INTERFACE-PORT parameter to the port
    number you wish served. The default for this is the standard
    WWW http port number 80. For example, include the line:
        LIST-AGENT-HTTP-INTERFACE-PORT: 5080
    to get http served on port 5080.
------------------------------------
-- info-infomod automatic responder Each response body may have pointers (URLs) to other responses, such as "/doc/config" above, as well as to page of documentation for deeper coverage. These documentation pages are also served via E-mail and http.

In the above example, the entry response includes an identifier "kb/httpport" 512, a teaser "How do I change which port the HTTP server serves?" 516, and a body "In the configuration file . . . to get http served on port 5080" 518. This entry response is stored in the knowledge base 500 as shown in FIG. 5. In this example, the automated responder ("auto-responder") of the moderator has successfully answered the user's question, so no further action is necessary. If, however, the user had asked a question that was not adequately addressed by the moderator's knowledge repository, for example, a question relating to the release date of an OS/2 version of the software, then the message is simply assigned a thread identifier 512, logged, and forwarded to all list members 172a (see FIG. 3) immediately without requiring the user to resend it. On the other hand, if the auto-responder does find possibly relevant entries, but the user remains unsatisfied, he may resend the original message 152m (a copy of which is in the moderator's first response message) to the moderator, retaining the thread identifier 512. The moderator knows that any message arriving with a valid thread identifier 512 should simply be logged and forwarded to all list members 172a. For example, a user may ask the following question which is not adequately addressed by the moderator:

Date: Thu, 14 Mar 96 18:35:45 EST
To: j.random@userhost2
From: hall@userhost1 (Bob Hall)
Sender: info-infomod@ListMailHost
Reply-to: info-infomod@ListMailHost
Subject: [info-infomod#18] OS/2 version
When will I be able to get a version of InfoMod that runs
under SS/2?
-- Bob The above message retains the originator in the "From" field, but the "sender" and "Reply-to" fields indicate the list address "info-infomod@ListMailHost". Any replies to the forwarded message go to the list address and retain the thread identifier "info-infomod#18" so they will be logged appropriately and so the auto-responder will ignore them.

A user does not always expect an answer to a message, however. For example, he might wish to announce the availability of a piece of contributed code or product of related interest. In such a case, the auto-responder can only get in the way, possibly forcing the user to resend the message once the thread identifier is assigned. To avoid this, the user may use a special thread identifier "info-infomod#announce" which signals the auto-responder to simply forward the message to all list members. These messages are all logged in the announce thread.

In addition to moderating the mailing list, another feature of InfoMod is it provides a web interface to its knowledge and documentation repository. For example, when a user browses to "http: //ListAgentHost/home.html.", he is presented with four top-level choices:

Welcome to the InfoMod Home Page!
* Overview
        What is InfoMod? And related introductory topics.
* Queries
        Submit a query against the knowledge base or send a
        message to the list.

-continued

* Knowledge Base
    Browse the knowledge base entries directly.
* Documentation
    Browse documentation of InfoMod and info-infomod.

Documentation takes the user to directory containing standard documentation of in-depth subtopics, such as "doc/config" that describes the format and meaning of the moderator's configuration file. Knowledge base takes the user to the directory of all response entries 510 (see FIG. 5), each one representing the answer to some particular question or query, such as "/kb/httpport" in the above example. Queries takes the user to an "info-infomod Query Form" as shown in FIG. 2. The user enters the free text of the message (as if it were an E-mail message to the list) in the large box 210. If he selects "KB Query Only" 220, then "Submit" 240 causes InfoMod's web server to apply the same relevance measures to the text as if it were an E-mail message. A web page list of identifiers 512 and teasers 514 forthose judged possibly relevant (sorted by retrieval-ratio as described above) is displayed. If "E-mail to list" 230 is selected instead, then the user must enter his or her E-mail address in the top field 250 and optionally a subject line 260. A message is then composed and sent to the list address as in the mailing list mode (in this mode, the web interface is simply a handy way of sending mail to the E-mail host).

Figure 3:
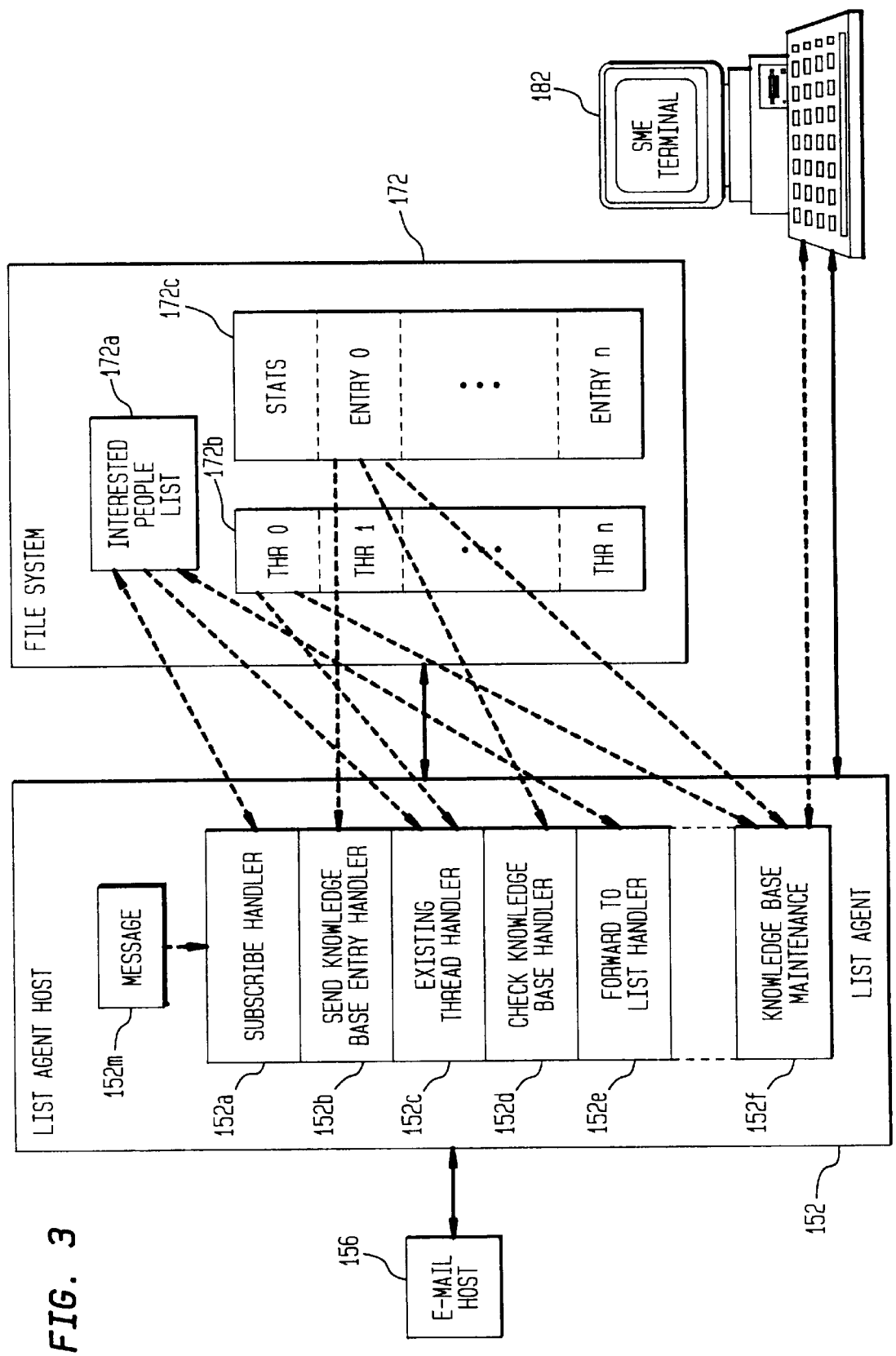
FIG. 3 illustrates a list agent or automated moderator for E-mail help lists which provides information for a list of people interested in a subject matter.

Message processors are provided in accordance with the principles of the present invention for handing the message down a prioritized list of processing finctions. Referring to FIG. 3, there are five exemplary message processors listed in order of priority that may handle any mailing list message:

Subscribe/unsubsribe handler 152a: If an E-mail message body 152m contains as its first nonblank line "subscribe" or "unsubscribe", this processor consumes it and performs the requested operation for the user name appearing in the "From" field of the message;

Send handler 152b: If a message body's 152m first nonblank line is of the form "Send ident-1 . . . ", this processor consumes the message, composes a reply that includes the full text of the knowledge entries named by the identifiers and sends it to the user named in the "From" field of the message.

Existing-Thread handler 152c: If a message has a subject line and if the subject contains a thread identifier of the form "info-infomod#n", then it verifies that n is a currently valid thread identifier and, if so, consumes the message and forwards it to all list members 172a as well as adding it to the thread log.

Check-Knowledge-Base Handler 152d: This processor compares the message text against its knowledge base of responses, using the shallow natural language approach further discussed below. If it finds any possibly-relevant entries, it consumes the message, logs it, assigns it a new thread identifier 172b, and composes the auto-responder reply message described above.

Forward-to-List Handler 152e: This processor (if reached) always consumes the message. It assigns a new thread identifier 172b, logs the message, and forwards it to all list members 172a, formatting it as discussed above.

Using the message processing features of the present invention, a great many of the annoying administrative messages sent mistakenly to mailing lists can be filtered out if the "Check-Knowledge-Base Handle" 152d has an entry that describes how to do the operation appropriately. For example, the standard entry "/kb/subsrib" tells how to subscribe and unsubscribe to/from the E-mail list, so any message sent to the list such as "please subscribe me to this list" will be responded to with a pointer to "/kb/subscribe" and not forwarded to other list members.

Judging relevancy in accordance with the technique of the present invention is now described. Many techniques are available for searching natural language document repositories for entries relevant to a user query, such as vector space techniques, boolean string searching, and keyword-based approaches. The InfoMod auto-responder judges possible relevance using a keyword-spotting approach. Referring to FIG. 5, each response knowledge base entry has four parts, an identifier 512, a query expression 514, a teaser 516, and a body 518. The teaser 516 is a brief description of the topic addressed by the entry, while the body 518 actually gives the details and possibly pointers (URLs) to other information sources.

The query expression 514, on the other hand, is an expression over string literals, with standard boolean operators (AND, OR, NOT) together with a WS ("white space-separated") operator allowing the matching of whitespace-separated phrases. An entry is judged relevant to a message if and only if the query expression is satisfied through matching and boolean combination.

For example, a "/kb/httpport" entry consists of a query expression, a blank line, a teaser, a blank line, and a body as follows:

```
(AND (OR (WS "port") "server" "interface")
    (OR "web" "http" "www"))
How do I change which port the HTTP server serves?
In the configuration file (cf. /doc/config), set the
LIST-AGENT-HTTP-INTERFACE-PORT parameter . . . (etc) . . .
```

To match this query expression (and hence be judged relevant), a message must satisfy both arguments of the AND: (a) it must either contain the string "port" surrounded by whitespace characters (or punctuation), the string "server", or the string "interface"; and (b) it must contain one of the strings "web", "http", or "www". "port" was used here in WS because it is commonly found embedded in other words, such as "portable", "important", and "export". Similarly, "web" frequently appears as both a stand-alone word or embedded in other words, such as "webserver", "world-wide-web", "web-browser". The decision of what words to use is made by a knowledge maintainer. The operator of knowledge based maintenance feature 152f and the SME may be the same or different persons.

It should be noted that novelty of the present invention lies in the fact that each knowledge entry has its own, separately controlled query. This is as opposed to prior art techniques where the querying user must himself formulate the appropriate query. The choice of query representation (such as the described boolean string matching language described above) is somewhat arbitrary, and other languages and query representations may be substituted by those skilled in the art.

Figure 4:
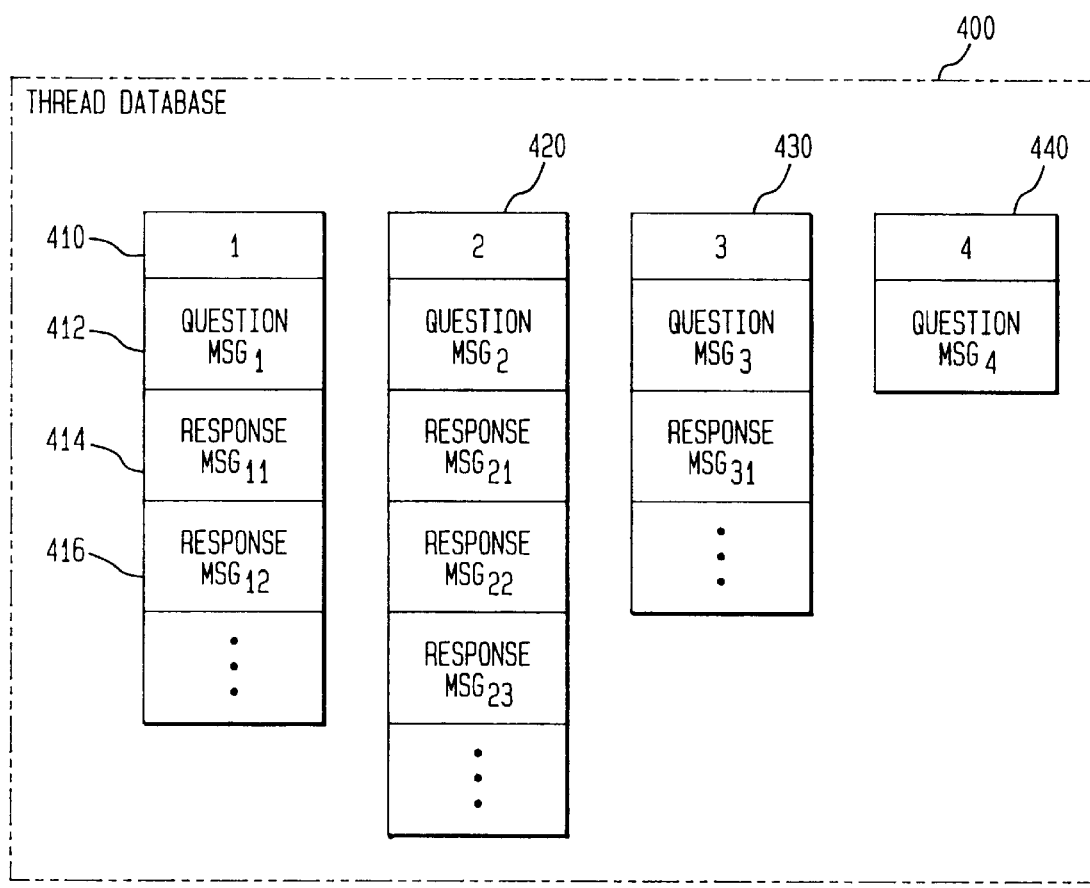
FIG. 4 illustrates a database of questions and threads of responses.

The knowledge base maintenance feature 152f of the present invention is now discussed. In contrast with similar systems employing either fully automated or distributed human knowledge acquisition, InfoMod requires centralized human effort in building and maintaining the response knowledge base. InfoMod provides tools 152f that assist in acquiring entries and optimizing their queries. One such tool is "Acquisition". InfoMod's logging and threading facility helps acquire entries by recording and grouping messages sent to the list. This is illustrated in FIG. 4. A thread database 400 comprises threads 410, 420, 430, etc. A thread 410 (group of messages on a given topic)typically has theform "question 412, response-1 414, response-2 416, . . . " If the knowledge maintainer, for example an SME, 182 (see FIG. 3) judges the thread worthy of an entry, then one can be created by editing and condensing the raw material of the thread, with the teaser typically derived from the question 412. The query is constructed using human judgment about which words and phrases are essential (possibly aided by a thesaurus). Each entry is examined by an SME for correctness, clarity, and other factors. Since relatively few entries are expected to be necessary, and since they will be acquired over a relatively long period of time, the requirement for human involvement is not onerous.

Another tool of InfoMod is "Query Tuning". One may find that the query of an entry is unsatisfactory during matching, leading to low precision (too many false positives), low recall (too many false negatives), or both. Referring to FIG. 5, the logging mechanism of InfoMod maintains usage statistics (statistical part 520) for each entry, both of how often it results in an auto-responder "hit", and how often its full text is retrieved by a user. It should be noted that this logs both E-mail accesses and web-interface accesses.

An entry with a low "hit" rate may have either an overly specific query or may address a topic not of general interest. If the maintainer 182 believes certain threads 512 should have generated hits on the entry, he can examine those threads to find one or more query disjuncts to add to the query that would increase its likelihood of a hit. A disjunct is an argument to a logical OR statement (an alternative condition). On the other hand, an entry that results in far more hits than retrievals (i.e., low retrieval-ratio) may have an overly-general query. The maintainer 182 can examine the hit threads 512 to discover the over generality and either add a conjunct to the query or remove a disjunct. A conjunct is an argument to a logical AND statement (another condition that must also be true).

Accordingly, the automated moderator of the present invention provides quick responses to E-mail help lists questions while maintaining the effectiveness of a knowledge based system and not annoying other users with unnecessary traffic.

What has been described is merely illustrative of the application of the principles of the present invention. Other arrangements and methods can be implemented by those skilled in the art without departing from the spirit and scope of the present invention.

What I claim is:

1. Apparatus for providing information about a subject matter, including a knowledge base for automatically responding to a user message, the apparatus comprising:

a logging means for receiving the user message when the knowledge base does not address the user message;

a storage means for storing the logged user message;

an output means for providing the logged user message to a terminal of a subject matter expert; and a receiving means for receiving data input from the subject matter expert, but not from other users of the system, the data input for:

a) updating the knowledge base by creating a query expression and a body of information, b) generating at least one query expression to the knowledge base, c) associating said query expression with said body of information, and d) controlling the manner in which the knowledge base responds to the user message by adding or removing a conjunct or a disjunct.

2. The apparatus of claim 1 wherein the user message is a question.

3. The apparatus of claim 1 wherein the user message is a comment.

4. An apparatus for providing information about a subject matter, including a knowledge base for automatically responding to a user message, the apparatus comprising:

a logging means for receiving the user message when the knowledge base does not address the user message;

a storage means for storing the logged user message;

an output means for providing the logged user message to a subject matter expert;

a receiving means for receiving data input, for updating the knowledge base, from the subject matter expert, but not from other users of the system; and wherein said knowledge base comprises:

a plurality of query expressions and bodies of information, the bodies being associated with the query expressions;

a comparator means for applying one of the query expressions to the user message;

a means for returning more than one body associated with the query expression when a plurality of query expressions are satisfied by the user message;

a plurality of teasers, the teasers being associated with the query expressions and being abstracts of the bodies; and wherein said output means further returns to a user the body associated with the query expression when the query expression is satisfied by the user message.

5. The apparatus of claim 4 wherein the user message is a question.

6. The apparatus of claim 4 wherein the user message is a comment.

7. An apparatus for providing information about a subject matter, including a knowledge base for automatically responding to a user message, the apparatus comprising:

a logging means for receiving the user message when the knowledge base does not address the user message;

a storage means for storing the logged user message;

an output means for providing the logged user message to a subject matter expert;

a receiving means for receiving data input from a subject matter expert, but not from other users of the system, for updating the knowledge base; and wherein said knowledge base comprises:

a plurality of query expressions and bodies of information, the bodies being associated with the query expressions;

a comparator means for applying one of the query expressions to the user message;

a means for returning more than one body associated with the query expression when a plurality of query expressions are satisfied by the user message;

a statistical part for recording the number of times a query expression is satisfied and the number of times the associated body is retrieved; and wherein said output means further returns to a user the body associated with the query expression when the query expression is satisfied by the user message.

8. The apparatus of claim 7 wherein the user message is a question.

9. The apparatus of claim 7 wherein the user message is a comment.

10. A computer-readable medium for providing information about a subject matter, the computer-readable medium comprising:
- a logging component for receiving the user message when a knowledge base component does not address the user message;
- a first component for providing the logged user message to a subject matter expert; and
- a second component whereby input ofthe subject matter expert, but not of other users,:
  a) updates the knowledge base component,
  b) transmits at least a query expression component to the knowledge base component,
  c) associates the query expression component with a body component, and
  d) controls the manner in which the fourth component responds to the user message by adding or removing a conjunct or a disjunct.

11. The computer-readable medium of claim 10 wherein the user message is a question.

12. The computer-readable medium of claim 10 wherein the user message is a comment.

13. A computer-readable medium for providing information about a subject matter, the computer-readable medium comprising:
- a logging component for receiving a user message when a knowledge base component does not address the user message;
- a first component for providing the logged user message to a subject matter expert; and
- a second component whereby input of the subject matter expert, but not of other users, updates the knowledge base component; and
- wherein said knowledge base component comprises:
  - a plurality of query expression components and body components, the body components being associated with the query expression components;
  - an application component for applying one of the query expression components to the user message and returning the body component associated with the query expression component to the computer-readable medium when the query expression component is satisfied by the user message; and
  - a plurality of teaser components, the teaser components being associated with the query expression components and being abstracts of said body components.

14. The computer-readable medium of claim 13 wherein the user message is a question.

15. The computer-readable medium of claim 13 wherein the user message is a comment.

16. A computer-readable medium for providing information about a subject matter, the computer-readable medium comprising:
- a logging component for receiving a user message when the knowledge base component does not address the user message;
- a first component for providing the logged user message to a subject matter expert; and
- a second component whereby input of the subject matter expert, but not of other users, updates the knowledge base component; and
- wherein said knowledge base component comprises:
  - a plurality of query expression components and body components, the body components being associated with the query expression components;
  - an application component for applying one of the query expression components to the user message and returning the body component associated with the query expression component to the computer-readable medium when the query expression component is satisfied by the user message; and
  - a statistical component for prerecording the number of times a query expression component is satisfied and the number of times the associated body component is retrieved.

17. The computer-readable medium of claim 16 wherein the user message is a question.

18. The computer-readable medium of claim 16 wherein the user message is a comment.

19. Apparatus for providing information about a subject matter, including a knowledge base for automatically responding to a user message, the apparatus comprising:
- a logging means for receivig the user message when the knowledge base does not address the user message;
- a storage means for storing the logged user message;
- a output means for providing the logged user message to a subject matter expert; and
- a receiving means for receiving data input, for updating the knowledge base, from the subject matter expert, but not from other usmn of the system,
- said knowledge base comprising:
  - a plurality of query expressions and bodies of infonmation, the bodies being associated with the query expressions;
  - a comparator means for applying one of the query expressions to the user message; and
  - a plurality of teasers the teasers being associated with query expressions and being abstracts of the bodies,
- said output means fiter retrns to a user, the body associated with the query expression when the query expression is satisfied by the user message.

20. Apparatus for providing information about a subject matter, including a knowledge base for automatically responding to a user message, the apparatus comprising:
- a logging means for receiving the user message when the knowledge base does not address the user message;
- a storage means for storing the logged user message;
- an output means for providing the logged user message to a subject matter expert; and
- a receiving means for receiving data input, for updatig the knowledge base, from the subject matter expert, but not from other users of the system,
- said knowledge base comprising:
  - a plurality of query expressions and bodies of information, the bodies being associated with the query expressions;
  - a comparator means for applying one of the query expressions to the user message; and
  - a statistical part for recording the number of teasers a query epression is satisfied and the number of times the associated body is retrieved,
- said output means further returns to a user, the body associated with the query expression when the query expression is satisfied by the user message.

21. Apparatus for providing information about a subject matter, including a knowledge base for automatically responding to a user message, the apparatus comprising:

a logging means for receiving the user message when the knowledge base does not address the user message;

a storage means for storing the logged user message;

an output means for providing the logged user message to a subject matter expert;

a receiving means for receiving data input, for updating the knowledge base, from the subject matter expression, but not from other users of the system; and a terminal means for permitting the subject matter expert to:
 a) update the knowledge base by creating a query expression and a body of information,
 b) transmit at least one query expression to the knowledge base,
 c) associate said query expression with said body of information, and
 d) control the manner in which a processor means responds to the user message, said query expression is created by one of adding or removing one of a conjunct or disjunct.

22. A computer-readable medium for providing information about a subject matter, including a knowledge base component for automatically responding to a user message, the computer-readable medium comprising:

a logging component for receiving the user message when the knowledge base component does not address the user message;

a first component or providing the logged user message to a subject matter expert; and a second component whereby input of the subject matter expert, but not of other users of the computer-readable medium, updates the knowledge base component the knowledge base component further comprising:
 a plurality of query expression components and body components, the body components being associated with the query expression components;
 an application component for applying one of the query expression components to the user message and for returning the body component associated with query expression component to the computer-readable medium when the query expression component is satisfied by the user message; and
 a plurality of teaser components, the teaser components being associated with the query expression components and being abstracts of said plurality of body components.

23. A computer-readable medium for providing information about a subject matter, including a knowledge base component for automatically responding to a user message, the computer-readable medium comprising:

a logging component for receiving the user message when the knowledge base component does not address the user message;

a first component for providing the logged user message to a subject matter expert; and a second component whereby input of the subject matter expert, but not of other users of the computer-readable medium, updates the knowledge base component the knowledge base component further comprising:
 a plurlity of query expression components and body components, the body components being associated with the query expression components;
 an application component for applying one of the query expression components to the user message and for returning the body component associated with the query expression component to the computer-readable medium when the query expression component is satisfied by the user message; and
 a statistical component for recording the number of times a query expression component is satisfied and the number of times the associated body component is retrieved.

* * * * *